United States Patent
Tults (10) Patent No.: US 6,784,943 B1
(45) Date of Patent: Aug. 31, 2004

(54) AUXILIARY DIGITAL DATA EXTRACTOR IN A TELEVISION

(75) Inventor: Juri Tults, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/582,186

(22) PCT Filed: Dec. 23, 1997

(86) PCT No.: PCT/US97/23973

§ 371 (c)(1),
(2), (4) Date: Nov. 16, 2000

(87) PCT Pub. No.: WO99/33269

PCT Pub. Date: Jul. 1, 1999

(51) Int. Cl.[7] .............................. H04N 7/00
(52) U.S. Cl. ..................... 348/465; 348/468
(58) Field of Search ................. 348/465, 468, 348/466, 467, 464, 473, 477, 478, 461; H04N 7/00

(56) References Cited

U.S. PATENT DOCUMENTS

| | | | | |
|---|---|---|---|---|
| 4,577,227 A | * | 3/1986 | Gurumurthy | ................ 348/464 |
| 4,638,497 A | | 1/1987 | Komatsu et al. | |
| 4,712,131 A | * | 12/1987 | Tanabe | ........................ 348/464 |
| 4,794,626 A | * | 12/1988 | Tanabe et al. | ............... 375/368 |
| 5,003,390 A | | 3/1991 | Helgert et al. | |
| 5,555,025 A | | 9/1996 | McArthur | |
| 6,239,843 B1 | * | 5/2001 | Gaudreau | .................... 348/465 |

FOREIGN PATENT DOCUMENTS

| | | | |
|---|---|---|---|
| EP | 567168 | 10/1993 | .......... H04N/7/087 |
| EP | 592216 | 4/1994 | ............ H04N/7/00 |
| EP | 750422 | 12/1996 | .......... H04N/7/088 |

OTHER PUBLICATIONS

European Search Report dated Aug. 4, 1998.

* cited by examiner

*Primary Examiner*—Michael H. Lee
(74) *Attorney, Agent, or Firm*—Joseph S. Tripoli; Joseph J. Laks; Robert D. Shedd (57) ABSTRACT

An auxiliary digital data extractor in a television receiver includes a source of a composite video signal. The composite video signal includes an auxiliary digital data component which is either a first frame code having a predetermined number of bits and auxiliary data in a first format, or a second frame code having the same number of bits and auxiliary data in a second format. A frame code detector is coupled to the composite video signal source. The frame code detector is responsive to one subset of the frame code bits to detect the first frame code and to a different subset of frame code bits to detect the second frame code. An auxiliary data utilization circuit is coupled to the composite video signal source and the frame code detector. The auxiliary data utilization circuit receives auxiliary data in the either first format when the first frame code is detected or the second format when the second frame code is detected.

11 Claims, 4 Drawing Sheets

AUXILIARY DIGITAL DATA EXTRACTOR IN A TELEVISION

The present invention relates to a television receiver including a system for identifying and extracting auxiliary digital data, having one of a plurality of formats, inserted in the vertical blanking interval of a television video signal.

Currently, auxiliary data, such as, for example, closed captioning information and extended data service (XDS) information, is transmitted in digital form during the vertical blanking interval of standard television signals. The closed captioning information represents the closed caption characters, and XDS information includes a variety of auxiliary data. This information is inserted in known locations in the vertical blanking interval of the television video signal and formatted in a known manner. In the NTSC television signal in the United States, line 21 in field 1 is reserved for closed captioning information, and line 21 of field 2 is reserved for XDS information.

Figure 1:
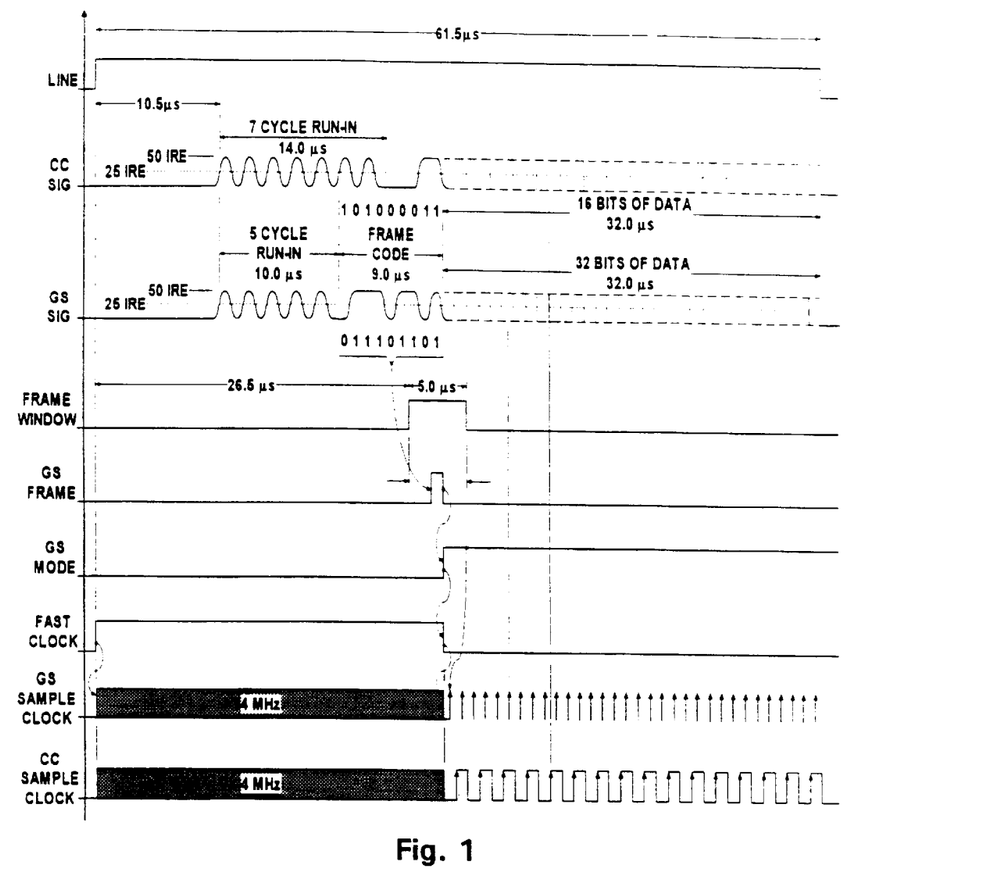
FIG. 1 is a waveform diagram useful in understanding the operation of the present invention.

Referring to FIG. 1, the closed captioning signal is illustrated in the second waveform from the top, labeled CC SIG. This signal includes a first interval of 10.5 microseconds ($\mu$s) in which the signal remains nominally at 0 IRE amplitude. This is followed by a clock run-in interval of 14 $\mu$s containing seven cycles of a 500 kHz sine wave clock signal having a peak-to-peak amplitude which is the same as the closed captioning data, which follows. The peak-to-peak amplitude is nominally 50 IRE. The run-in interval is followed by a 3 $\mu$s period of 0 IRE signal. After the 3 $\mu$s 0 IRE signal interval, a start bit of 2 $\mu$s duration occurs, followed by 16 data bit intervals, each also of 2 $\mu$s duration, in which data is transmitted in a non-return-to-zero (NRZ) format. In this manner, two bytes of closed captioning information is transmitted. A closed captioning processor in a receiver extracts the closed captioning data from its location in the vertical blanking interval and displays that information on the television display device.

Digital auxiliary information other than closed captioning and XDS information may also be transmitted in the vertical blanking interval, using the same format, for example, television program scheduling information. A scheduling service has been provided by Star-sight company in which scheduling information was transmitted in the vertical blanking interval of the video signal, using the same format as the closed caption information. A scheduling processor in a receiver extracts the scheduling data from its location in the vertical blanking interval and displays that information, allowing the viewer to make TV program selections based on the displayed scheduling data. Recently, however, another format for auxiliary digital data, specifically TV program scheduling data, has been proposed by Gemstar company.

No location in the vertical blanking interval has been reserved for the Star-sight or Gemstar scheduling information. Thus, different broadcasters are free to include it in any location in the vertical blanking interval, except those locations (lines 21 in fields 1 and 2) reserved for closed captioning information and XDS information. Also, data transmitted in the proposed Gemstar system, may at times be in the closed caption format, described above, and at other times be in a newly proposed format, termed the Gemstar format in the remainder of this application.

The Gemstar format signal is illustrated in FIG. 1 as the third waveform from the top, labeled GS SIG. A Gemstar format line in the vertical blanking interval also starts with 10.5 $\mu$s of nominally 0 IRE signal. But that interval is followed by only 5 cycles of a 500 kHz, nominally 50 IRE peak-to-peak, sine wave run-in clock signal. The run-in clock signal is immediately followed by a digital nine bit frame identifying code having the predetermined value of 011101101. Each bit in the frame code takes 1 $\mu$s, and is in NRZ format. The frame code is immediately followed by 32 data bits, each also taking 1 $\mu$s, in NRZ format. In this manner four bytes of scheduling data is transmitted in the closed captioning location in the vertical blanking interval. Again, a scheduling processor in the receiver extracts the scheduling data from its location in the vertical blanking interval and allows the viewer to make selections based on the scheduling data.

It is desirable to provide an auxiliary information decoder that reliably decodes multiple auxiliary data formats such as both Gemstar format data and closed caption data. One problem that can arise when decoding auxiliary data is that signal noise can cause data to be decoded incorrectly. For example, noise may cause one or more bits of a frame code to be incorrect. As a result, a frame code detector may process a frame code containing noise-related errors and indicate incorrectly the type of data that exists in a particular portion of a television signal. For example, a decoder processing a Gemstar frame code containing erroneous bits may indicate incorrectly that the line interval associated with the frame code does not contain Gemstar data. As a result, the decoder may ignore the line interval rather than decode the data as desired.

In accordance with principles of the present invention, an auxiliary digital data extractor in a television receiver processes a composite video signal including auxiliary digital data components which have either a first frame code having a predetermined number of bits and auxiliary data in a first format, or a second frame code having the same number of bits and auxiliary data in a second format. A frame code detector is responsive to one subset of the frame code bits to detect the first frame code and to a different subset of frame code bits to detect the second frame code. An auxiliary data utilization circuit receives auxiliary data in the either first format when the first frame code is detected or the second format when the second frame code is detected.

In accordance with another aspect of the invention, an auxiliary information decoder has a first mode of operation for detecting any occurrence of auxiliary information in a signal and a second mode of operation for detecting a particular occurrence of auxiliary information in the signal.

The invention will be explained with reference to the drawing in which.

In the remainder of this application, the term television receiver will refer to a system capable of receiving and processing a television signal, whether or not that system is capable of rendering the video image and the associated audio component. For example, the term television receiver is meant to refer to a standard television receiver with a display and speakers, and also to refer to the circuitry in a video cassette recorder (VCR) or set-top cable or satellite box, all of which contain circuitry capable of receiving and processing a television signal, but not of displaying the image or rendering the sound represented by that television signal. In addition, in the remainder of this application, the auxiliary digital information will refer to either closed caption information or Gemstar scheduling information.

Figure 2:
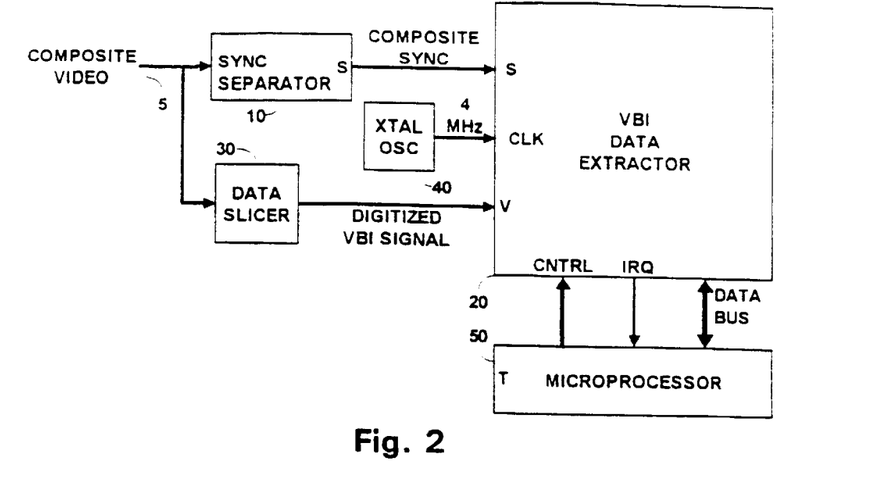
FIG. 2 is a block diagram of a portion of a television receiver incorporating the present invention.

FIG. 2 is a block diagram of a portion of a television receiver incorporating the present invention. In FIG. 2, only those portions of the receiver necessary for understanding the operation of the present invention are illustrated. One skilled in the art will understand what other elements are necessary in an operating television receiver, and how to interconnect those other elements with the elements illustrated in FIG. 2.

In FIG. 2, an input terminal 5 is coupled to a source (not shown) of a composite video signal. For example, in a standard television receiver, this source may include an antenna or cable connection, RF and IF amplifiers, a detector, and possibly an element for separating the audio component from the video component. As another example, in a standard VCR, the source may include a tape transport mechanism, tape read head and read-back amplifiers. The input terminal 5 is coupled to respective input terminals of a synchronization component separator 10, and a data slicer 30. A composite synchronization signal output terminal 5 of the synchronization component separator 10 is coupled to a corresponding input terminal 5 of a vertical blanking interval (VBI) data extractor 20. An output terminal of the data slicer 30 is coupled to a VBI signal input terminal V of the VBI data extractor. An output terminal of a crystal oscillator 40 is coupled to a clock input terminal (CLK) of the VBI data extractor 20.

A microprocessor 50 is coupled to the VBI data extractor by a bidirectional eight-bit data bus. A control output terminal of the microprocessor 50 is coupled to a corresponding input terminal of the VBI data extractor 20, while an interrupt request output terminal of the VBI data extractor 20 is coupled to a corresponding input terminal of the microprocessor 50.

In operation, the composite video signal at input terminal 5 is a standard composite video signal, such as, in the United States, an NTSC composite video signal, and contains a video component and a synchronization component (among other components not germane to the understanding of the present invention). The synchronization component separator 10 operates in a known manner to separate the composite synchronization component from the composite video signal and supply that synchronization component to the VBI data extractor 20.

The data slicer 30 produces a serial stream of digital bit signals representing the composite video signal in a known manner. When the value of the composite video signal is greater than the value of a slice level, the slicer 30 digital output signal is at a first logic level, and when the value of the video signal is less than the value of the slice level, the digital output signal is at a second logic level. In the exemplary embodiment described herein, the first and second logic levels correspond to logic '1' and logic '0' values, respectively. Referring to FIG. 1, the second waveform from the top CC SIG illustrates the closed caption format data signal. The run-in signal, consisting of seven sine wave cycles, has a peak-to-peak value which is the same as the NRZ data signal which follows. The base value of the sine wave is nominally 0 IRE and the peak value is nominally 50 IRE. Thus, a slicing level signal, selected to be midway between the base and peak values, is nominally 25 IRE, as illustrated in the CC SIG waveform. The base and peak values of the received run-in signal can, of course, vary, but should still be the same as the values of the corresponding portions of the following NRZ data. Thus, the slicing level may be set to the midpoint between the actual received base and peak values of the run-in signal in a known manner.

Starting with the last two cycles of the run-in signal, 9 μs of the output from the data slicer 30, representing the frame code, is illustrated on the CC SIG signal. When the CC SIG signal is greater than the illustrated slicing level of 25 IRE, the digital output signal from the slicer 30 is a logic '1' signal, and when the CC SIG signal is less than the illustrated slicing level, the value of the digital output signal is a logic '0' signal. The binary frame code produced by the data slicer 30 in response to the CC SIG signal, therefore, is 101000011.

The microprocessor 50 supplies data specifying the line of the vertical blanking interval from which auxiliary digital data is to be extracted to the VBI data extractor 20 via the data bus and control signals. This data may be stored in a register in the VBI data extractor 20 in a known manner.

The VBI data extractor 20 operates, in a manner described in more detail below, to process the digitized VBI signal from the VBI horizontal line previously specified by the microprocessor 50. The VBI data extractor 20 determines the presence and format of, and extracts the data in the VBI. At the end of that VBI horizontal line, the microprocessor 50 is notified by means of an interrupt request on the IRQ output terminal. In response to the interrupt request, the microprocessor 50 determines if VBI data was present in that line, and if so, transfers the extracted data from the VBI data extractor 20 to the microprocessor via the data bus by means of read enable signals supplied to the VBI data extractor 20 via the control output terminal, all as described in more detail below.

Figure 3:
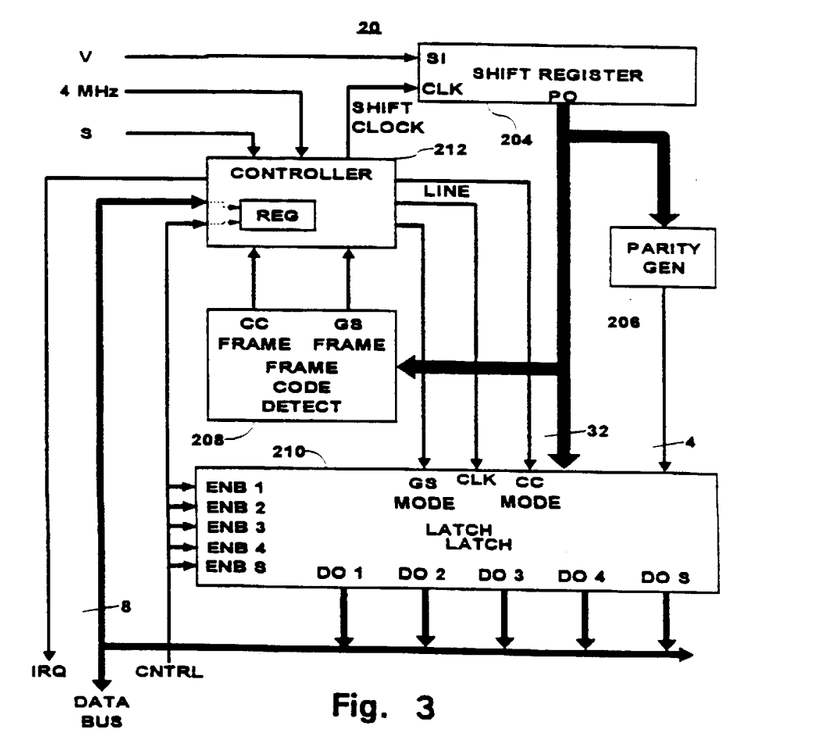
FIG. 3 is a more detailed block diagram of a vertical blanking interval data extractor according to the present invention.

FIG. 3 is a more detailed block diagram of a vertical blanking interval data extractor 20 according to the present invention. In FIG. 3, an input terminal V receives the digitized VBI component of the video signal from the data slicer 30 (of FIG. 2). The input terminal V is coupled to a serial data input terminal SI of a 32 bit shift register 204. A 32 bit parallel output terminal PO of the shift register 204 is coupled to respective input terminals of a parity generator 206, a frame code detector 208 and a latch 210. A four bit output terminal of the parity generator 206 is coupled to a corresponding input terminal of the latch 210.

First and second output terminals of the frame code detector 208, producing respective signals CC FRAME and GS FRAME (described in more detail below), are coupled to corresponding input terminals of a controller circuit 212. An input terminal S, receives the composite synchronization signal from the synchronization signal separator 10 (of FIG. 2). The input terminal S is coupled to a corresponding input terminal of the controller circuit 212. The 4 Mhz clock signal from the crystal oscillator 40 (of FIG. 2) is coupled to a clock signal input terminal of the controller circuit 212.

A first output terminal of the controller circuit 212, producing a shift clock signal is coupled to a shift clock input terminal of the shift register 204. Second and third output terminals of the controller circuit 212, producing signals GS MODE and CC MODE, respectively, (described in more detail below), are coupled to corresponding input terminals of the latch 210. A fourth output terminal of the controller circuit 212, producing a LINE signal, is coupled to a clock input terminal CLK of the latch 210.

A fifth output terminal of the controller circuit 212, producing an interrupt request signal IRQ, is coupled to an output terminal IRQ, which is coupled to the microprocessor 50 (of FIG. 2). A CNTRL input terminal is coupled to a control output terminal of the microprocessor 50. The CNTRL input terminal is coupled to a corresponding input terminal of the controller circuit 212, and to five enable input terminals: ENB 1, ENB 2, ENB 3, ENB 4 and ENB S of a latch 210. An eight-bit bidirectional data bus terminal is also coupled to the microprocessor 50. The data bus terminal is coupled to an input terminal of the controller circuit 212 and to five eight-bit data output terminals: DO 1, DO 2, DO 3, DO 4 and DO 5 of the latch 210.

In general operation, the microprocessor 50 (of FIG. 2) transfers data specifying a horizontal line in the vertical blanking interval to a register REG in the controller circuit 212, via the data bus and control signals at the CNTRL input terminal, in a known manner. The controller circuit 212 monitors the composite synchronization signal from the S input terminal. When the horizontal line specified in the register REG occurs, the VBI signal serial data stream for that horizontal line, from the data slicer 30, is shifted through the shift register 204 in response to the shift clock signal from the controller circuit 212. The frame code detector 208 monitors the 32 bits at the parallel output terminal of the shift register 204 to detect the frame code of either a closed caption format signal or a Gemstar format signal.

If a closed caption format signal is detected, an indication that closed caption format data is available is supplied to the latch 210 via the CC MODE signal. If a Gemstar format signal is detected, an indication that Gemstar format data is available is supplied to the latch 210 via the GS MODE signal. In either of these cases, the auxiliary digital data in the detected format is extracted by the shift register 204 and, along with associated parity information from the parity generator 206, also stored in the latch 210. If neither format signal is detected, an indication that no data is available is stored in the latch 210. At the same time the above information is stored in the latch 210, an interrupt signal is supplied to the microprocessor 50 via the IRQ signal line. The microprocessor 50, in response to the interrupt request signal, reads the contents of the latch 210, via the data bus and enable signals on the CNTRL input terminal, all in a manner to be described in more detail below.

Although the illustrated embodiment includes the latch 210, one skilled in the art will understand that it is not absolutely required. If the microprocessor 50 can respond to the IRQ signal, and retrieve the GS MODE and CC MODE signals, and the auxiliary digital data and associated parity data before the next occurrence of the particular VBI line interval (the VBI line interval specified by data in register REG in FIG. 3), then the latch 210 may be omitted. In this case, the microprocessor 50 reads the data directly from controller circuit 212, the shift register 204 and parity generator 206.

The controller circuit 212 includes counters and associated circuitry (not shown), of a known arrangement, for monitoring the composite synchronization signal from the S input terminal to detect vertical fields and count horizontal lines. The controller circuit 212 also includes circuitry, also of known arrangement, to compare the current horizontal line to the horizontal line specified by the data in the register REG. The LINE signal is made active (e.g., a logic '1' as in the illustrated embodiment) at the beginning of the 'active portion' of the specified horizontal line, and remains inactive (logic '0') otherwise. Referring to FIG. 1, the topmost waveform illustrates the LINE signal for the horizontal line in the vertical blanking interval specified by the data in the register REG.

At the same time the LINE signal is made active, the controller circuit 212 begins to supply a 4 Mhz shift clock to the shift register 204. In this manner, the serial bit stream from the data slicer 30 (of FIG. 2), representing the VBI video signal, is clocked through the shift register 204. In the illustrated embodiment, the shift register 204 is clocked at the leading edges of the shift clock signal. As described above, the VBI data signal has the format illustrated in either the CC SIG waveform or the GS SIG waveform of FIG. 1. The Gemstar format signal GS SIG, after an initial 10.5 $\mu$s period and a five cycle run-in clock period, is followed by a 9 $\mu$s interval which, when digitized, contains a frame code signal which has the digital value 011101101. During the same 9 $\mu$s time interval, the closed caption format signal CC SIG includes a digital bit stream which has the value 101000011.

In the illustrated embodiment, the frame code interval is the 9 $\mu$s interval following the initial 10.5 $\mu$s period and five cycle run-in clock period, which is common to both format signals. That is, the frame code interval starts at the first point where the two different format signals have different values, and ends where the digital auxiliary data for both format signals starts. One skilled in the art will understand that the definition of a frame code period is arbitrary and can include any portion of the signal which is sufficient to distinguish data in one format from data in the other format.

The frame code detector 208 monitors the state of the 32 bits at the parallel output terminal of the shift register 204. The frame code detector 208 operates in one of two operating modes. The first mode is a search mode during which the detector searches for any occurrence of auxiliary information such as a frame code. That is, in the search mode, it is not 5 known whether auxiliary digital data in either closed caption or Gemstar format is included in the video signal, and if it is, it is not known what line contains that data. Such data could be included in any horizontal line in the vertical blanking interval: for example, from line 10 to 20 in either field 1 or 2. Furthermore, it is possible that data in other formats is inserted into lines in the vertical blanking interval. To increase certainty of detection and minimize false identification of an arbitrary signal as the desired format signal, the criteria for detecting either the closed caption or Gemstar frame code are tightened in the search mode. All available frame code bits in the received digitized VBI signal are compared to corresponding bits in either the Gemstar, frame code of 011110110 or the closed caption frame code of 1010000011, possibly for more than one sequential frame of video during the search mode. Once the presence and location of auxiliary digital data in either closed caption or Gemstar format has been verified, the search mode is terminated.

When the search mode is terminated, the frame code detector 208 enters the second mode of operation, termed the locked-on mode in the remainder of this application, during which a particular occurrence of auxiliary information is detected. That is, in the locked-on mode, the location of the auxiliary data in the vertical blanking interval has been determined, and data representing that location is stored in the register PEG in the controller circuit 112.

Thus, the detector can look for occurrence of the desired auxiliary information in the particular line interval that is indicated by the data stored in register REG. The frame code detector 208, in a manner to be described in more detail below, continues to monitor the 32 bits from the shift register 204 to detect either the Gemstar frame code of 01110110 or the closed caption frame code of 101000011. In the locked-on mode, however, in order to minimize disruption in the presence of a noisy signal, the detection criteria for detecting either the closed caption or Gemstar frame codes are loosened relative to those in the search mode. The remainder of this application will describe the locked-on mode of operation, unless the search mode is explicitly specified.

Whenever the Gemstar frame code of 011101101 is detected by the frame code detector 208, a GS FRAME pulse signal, as illustrated in FIG. 1, is generated. In a similar manner, although not illustrated in FIG. 1, whenever the closed caption frame code of 101000011 is detected by the frame code detector 208, a CC FRAME pulse signal is generated, all in a manner to be described in more detail below.

The controller circuit 212 receives the CC FRAME and GS FRAME signals from the frame code detector 208. In order to increase the accuracy of detection of the frame code, the controller circuit 212 generates a FRAME WINDOW signal. The FRAME WINDOW signal is derived from the composite synchronization signal, in a known manner, and is made active (is a logic '1' signal in the illustrated embodiment) for a time interval surrounding the nominal time when either a GS FRAME or CC FRAME pulse could occur validly and is inactive (logic '0') otherwise. In the illustrated embodiment, the FRAME WINDOW signal is active for a 5 µs interval around the nominal time when a GS FRAME or CC FRAME pulse should occur, which is 29.5 µs from the time the LINE signal become active. This is illustrated as waveform FRAME WINDOW in FIG. 1.

During the time interval when the FRAME WINDOW signal is active, the CC FRAME and GS FRAME signals are monitored by the controller circuit 212. If a pulse is detected in the GS FRAME signal (as illustrated in the GS FRAME signal in FIG. 1), the controller circuit 212 makes the GS MODE signal active (logic '1' in the illustrated embodiment) as illustrated in the GS MODE signal in FIG. 1. This indicates that Gemstar format data is present in the specified horizontal line, and that data follows. The Gemstar format data is in the form of a 32 bit NRZ data stream, each bit interval being 1 µs, as described above. In response to the detection of the GS FRAME signal, the controller circuit 212 supplies a shift clock signal to the shift register 204 such that sampling signals (e.g. leading edges) are generated at the middle of each Gemstar data bit interval as illustrated in the GS SAMPLE CLOCK signal in FIG. 1. Thus, for the first portion of the line. e.g. until the GS FRAME pulse is detected, the shift clock signal is a 4 MHz clock signal. For the second portion of the line. e.g. after the GS FRAME pulse is detected, the shift clock signal is a 1 MHz signal phased so that leading edges (e.g. sampling signals) are synchronized to the center of the Gemstar data bit intervals.

In a similar manner, although not illustrated in FIG. 1, if a pulse is detected in the CC FRAME signal, the controller circuit 212 makes the CC MODE signal active (logic '1' in the illustrated embodiment). This indicates that closed caption format is present in the specified horizontal line, and that data follows. The closed caption format data is in the form of a 16 bit NRZ data stream, each bit interval being 2 µs. In response to the detection of the CC FRAME signal, the controller circuit 212 supplies a shift clock signal to the shift register 204 such that sampling signals (e.g. leading edges) are generated at the middle of each closed caption data bit period, as illustrated in the CC SAMPLE CLOCK signal in FIG. 1. Thus, for the first portion of the line, e.g. until the CC FRAME pulse is detected, the shift clock signal is a 4 MHz clock signal. For the second portion of the line, e.g. after the CC FRAME pulse is detected, the shift clock signal is a 500 kHz signal phased so that leading edges (e.g. sampling signals) are synchronized to the center of the closed caption data bit intervals.

If neither a CC FRAME signal nor a GS FRAME signal is detected by the frame code detector 208 while the FRAME WINDOW signal is active, then neither the GS MODE nor the CC MODE signal is generated, and no change of frequency and phase in the shift clock signal occurs.

In response to the changed shift clock signal, the shift register 204 samples the digital signal from the data slicer 30 (of FIG. 2) at the middle of the bit intervals for either the Gemstar format (GS SIG of FIG. 1) or the closed caption format (CC SIG), as selected by the CC FRAME and GS FRAME signals. At the end of the active portion of the VBI horizontal line, the shift register 204 contains the VBI data. This data is present at the parallel output terminal PO of the shift register 204, and supplied to the latch 210. The 32 bits are partitioned into 4 eight-bit bytes. Simultaneously, the parity generator 206 calculates four parity bits, one corresponding to each of the partitioned bytes from the shift register 204. The parity bits are also supplied to the latch 210.

When the active portion of the VBI horizontal line ends, the LINE signal is made inactive again by the controller circuit 212, as illustrated in FIG. 1. The LINE signal is coupled to the clock input terminal CLK of the latch 210. In response to the LINE signal becoming inactive, the latch 210 latches the VBI data signals from the shift register 204, the GS MODE and CC MODE signals from the controller circuit 212, and the parity bits from the parity generator 206. The four bytes from the shift register 204 are latched into respective four bytes of the latch 210. The four parity bits are latched into four bits of a fifth byte, termed the status byte, of the latch 210. Finally, the GS MODE and CC MODE signals from the controller circuit 212 are latched into fifth and sixth bits of the fifth, status, byte in the latch 210.

Also in response to the LINE signal becoming inactive, and simultaneous with latching the data and status information into the latch 210, the controller circuit 212 generates an interrupt request signal IRQ, which is supplied to the microprocessor 50 (of FIG. 2). In a known manner, in response to the IRQ signal, the microprocessor 50 executes an interrupt handler routine. The interrupt handler routine conditions the microprocessor 50 to read the status byte from the latch 210 by activating the status byte enable signal ENB S. In response to the status byte enable signal ENB S, the output terminal of the latch 210 producing the status byte, DO S is coupled to the microprocessor 50 data bus, and the data is read by the microprocessor 50. The interrupt handler tests the data bits containing the GS MODE and CC MODE signals. If the GS MODE bit is active, then 32 bits of auxiliary digital data were transmitted in the VBI line, and all four data bytes are read by the microprocessor 50. In this case, the microprocessor sequentially activates the data byte enable signals ENB 1. ENB 2. ENB 3 and ENB 4. In response to the ENB 1 signal, the latch 210 places the contents of the first data byte at data output terminal DO 1 on the data bus, and that data is read by the microprocessor 50. Similarly, the second, third and fourth bytes, at data output terminals DO 2, DO 3 and DO 4, respectively, are placed on the data bus in response to data byte enable signals ENB 2, ENB 3 and ENB 4, respectively. If desired, the microprocessor 50 can also check the parity of these data bytes by analyzing the four parity bits present in the status byte.

In the event that the CC MODE signal is active, this indicates that closed captioning information was transmitted during the VBI line. In this case, however, only 16 bits, or two bytes of auxiliary digital data were transmitted, and only data bytes at the data output terminals DO 3 and DO 4 contain valid information. The microprocessor reads these data bytes after providing the respective enable signals. The received data bytes can then be processed in the appropriate manner, such as extracting scheduling information and displaying such information to the viewer.

Figure 4:
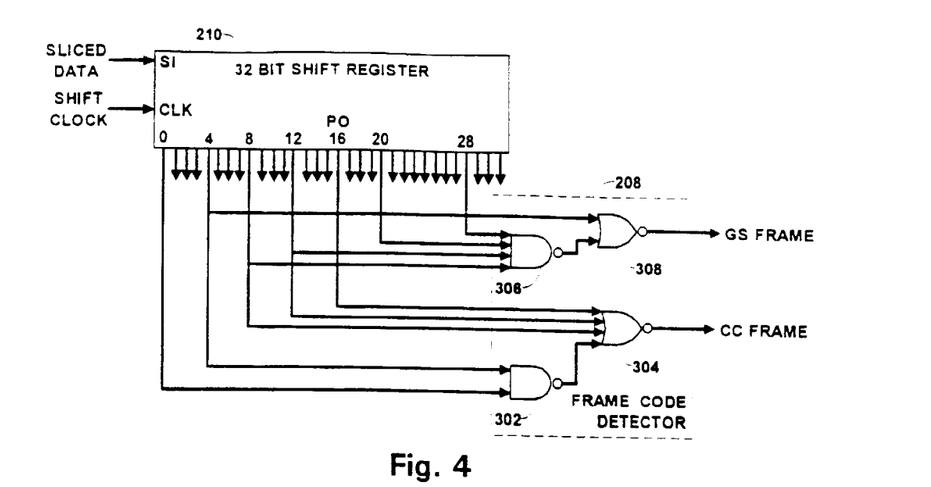
FIG. 4 is a more detailed diagram, partially in block form, and partially in logic form, illustrating a frame code detector which may be used in a vertical blanking interval data extractor illustrated in FIG. 3.

FIG. 4 is a more detailed diagram, partially in block form, and partially in logic form, illustrating the portion of the frame code detector 208 operative during the locked-on mode. In FIG. 4, elements which are the same as those illustrated in FIG. 3 are designated by the same reference number and are not described in detail. In FIG. 4, the shift register 204 is illustrated with the serial input terminal SI and the shift clock input terminal CLK, and with 32 single-bit parallel output terminals. The leftmost output terminal, labeled "0" contains the most recently received bit.

Respective output terminals 0 and 4 are coupled to first and second input terminals of a negative output AND (NAND) gate 302. Respective output terminals 8, 12 and 16 are coupled to first, second and third input terminals of a negative output OR (NOR) gate 304. Respective output terminals 8, 12, 20 and 28 are coupled to first, second, third and fourth input terminals of a second NAND gate 306. Output terminal 4 is coupled to a first input terminal of a second NOR gate 308. An output terminal of the first NAND gate 302 is coupled to a fourth input terminal of the NOR gate 304, and an output terminal of the second NAND gate 306 is coupled to a second input terminal of the second NOR gate 308. An output terminal of the first NOR gate 304 produces the CC FRAME signal, and an output terminal of the second NOR gate 308 produces the GS FRAME signal.

Referring to FIG. 1, up to the point where either a GS FRAME signal or a CC FRAME signal is generated, the digital bit stream from the slicer 10 (of FIG. 2) is sampled at a 4 Mhz rate in response to the GS SAMPLE CLOCK signal. Because each bit in the frame code portion of the signal is 1 µs in duration, each such bit is oversampled four times by the shift register 204. That is, each bit is stored in four adjacent locations in the shift register 204. Thus, in order to properly sample the different bits in the frame code, every fourth bit in the shift register 204 is processed by the frame code detector.

In the current embodiment, only eight of the nine frame code bits may be stored in the 32 bit shift register 204, consequently only those eight bits are available for processing to detect a valid Gemstar or closed caption frame code. However, in the illustrated embodiment only a subset of 5 bits of the available set of eight bits are processed to determine whether a closed caption frame or a Gemstar frame is present. Those five bits, and their values, are: (x)xxx00011 to detect a valid closed caption frame code, and (x)1x1x110x to detect a valid Gemstar frame code, where (x) indicates the ninth, unavailable bit, and x indicates a 'don't care' bit.

In FIG. 4, the leftmost bits of the frame code arrive at the shift register 204 first, and are shifted out first. Thus, the first bit of the frame code is shifted completely through and out of the shift register 204 before the last bit is received. Conversely, the last bit of the frame code (rightmost bit) is the most recent bit shifted into the shift register 204 and is in the leftmost bit position (bit 0) in the shift register 204 as it is illustrated in FIG. 4.

In FIG. 4, if both shift register 204 bits 0 and 4, representing the rightmost two bits of the frame code, are logic '1' bits, then the output of the first NAND gate 302 is a logic '0' signal, otherwise it is a logic '1' signal. If shift register 204 bits 8, 12 and 16, representing the next three bits of the frame code, and the output from the first NAND gate 302, are all logic '0' signals, then the signal at the output terminal of the first NOR ate 304, CC FRAME, is a logic '1' signal indicating that a closed caption frame code has been detected.

If bits 8, 12, 20 and 28 from the shift resister 204 are all logic '1' signals, then the output from the second NAND gate 306 is a logic '0' signal. If bit 4 from the shift register 204 and the output of the second NAND gate 306 are both logic '0' signals, then the signal at the output terminal of the second NOR gate 308, GS FRAME, is a logic '1' signal indicating that a Gemstar frame code has been detected. Because the frame code bits are each 1 microsecond in duration and are oversampled by the 4 MHz clock (i.e., 4 successive samples of each frame code bit are stored in the shift register), the GS FRAME signal remains valid for four shift clock cycles.

The particular subset of five bits selected for use by the frame code detectors of the present invention have been selected on the basis of experiments made with the objective to maximize detection of valid frame codes in weak signal condition, which is equivalent to signals containing random, or white noise (correlated noise may produce other results). By implementing the frame code detectors as illustrated, only a few relatively simple gates are required, while performance is substantially equivalent to detectors that process all frame code bits. Implementing frame code detectors that process all frame code bits, however, would require a larger shift register (44 shift register bits to hold all 11 frame code bits of the Gamester frame code), and a substantially more complicated combinatorial logic circuit to process those eleven bits (eight bits for the closed caption frame code).

Figure 5:
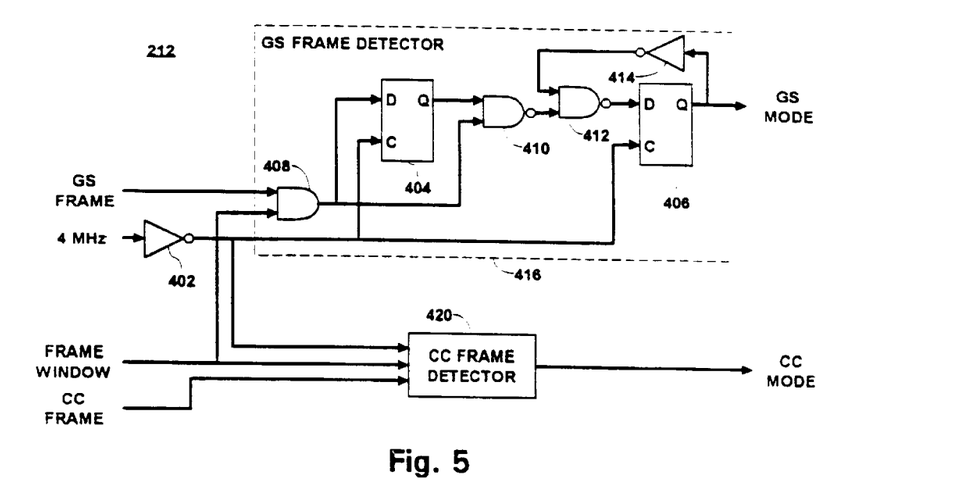
FIGS. 5 and 6 are more detailed diagrams, partially in block form, and partially in logic form, illustrating portions of the controller circuit illustrated in FIG. 3.

FIG. 5 is a more detailed diagram, partially in block form, and partially in logic form, illustrating a portion of the controller circuit 212 illustrated in FIG. 3 which generates the GS MODE and CC MODE signals in response to the GS FRAME and CC FRAME signals, respectively. In FIG. 5, the 4 MHz clock signal from the crystal oscillator 40 (of FIG. 2) is coupled to an input terminal of an inverter 402. An output terminal of the inverter 402 is coupled to respective clock input terminals of a first D flip flop 404 and a second D flip flop 406, and to a first input terminal of a closed caption (CC) frame detector circuit 420. The FRAME WINDOW signal, generated internally from the composite synchronization signal, as described above, is coupled to a first input terminal of an AND gate 408 an a second input terminal of the CC frame detector 420.

The GS FRAME signal from the frame code detector 208 (of FIG. 3) is coupled to a second input terminal of the AND gate 408. An output terminal of the AND gate is coupled to a D input terminal of the first D flip flop 404 and a first input terminal of a first NAND gate 410. A Q output terminal of the first flip flop 404 is coupled to a second input terminal of the first NAND gate 410. An output terminal of the first NAND gate is coupled to a first input terminal of a second NAND gate 412. An output terminal of the second NAND gate 412 is coupled to a D input terminal of the second flip flop 406. A Q output terminal of the second flip flop 406 generates the GS MODE signal which is coupled to the latch 210. The Q output terminal of the second flip flop 406 is also coupled to an input terminal of a second inverter 414. An output terminal of the second inverter 414 is coupled to a second input terminal of the second NAND gate 412. The combination of the AND gate 408, first D flip flop 404, second D flip flop 406, first NAND gate 410, second NAND gate 412 and inverter 414 form a Gemstar (GS) frame detector.

The CC FRAME signal from the frame code detector 208 (of FIG. 3) is coupled to a third input terminal of the CC frame detector 420. The CC frame detector 420 is constructed identically to the GS frame detector 416, and operates in the same manner (described in more detail below). An output terminal of the CC FRAME detector produces the CC MODE no signal, and is coupled to the latch 210.

In operation, at the beginning of each horizontal line, the first and second D flip flops 404 and 406 are reset, by circuitry of a known design (not shown), e.g., generating a reset signal in response to the horizontal synchronization component in the composite video signal and supplying that reset signal to a reset input (not shown in FIG. 5) of each of flip flops 404 and 406. Consequently, the signals at the Q output terminals of the first and second D flip flops 404 and 406 at the beginning of a horizontal line are both logic '0' signals. Thus, the GS MODE output signal is a logic '0' signal. In addition, the GS FRAME input signal is a logic '0' signal until a Gemstar frame code is detected, (as illustrated in FIG. 1). So long as the FRAME WINDOW signal remains a logic '0' signal, the AND gate 408 remains disabled, and produces a logic '0' signal, causing Q output terminal of the first D flip flop 404 to continue to produce a logic '0' signal when clocked by the inserted 4 MHz clock signal. The first NAND gate 410 is thereby disabled and generates a logic '1' signal. The output of the inverter 414, similarly is a logic '1' signal. The output of the second NAND gate 412, thus, is a logic '0'signal causing the second D flip flop 406 to continue to produce a logic '0' signal at its Q output terminal when clocked by the inverted 4 MHz clock signal. The GS frame detector 416 remains in this state so long as no GS FRAME signal pulse is received.

The GS frame detector 416 recognizes receipt of a valid Gemstar frame code only if that code occurs in two successive cycles of the 4 MHz clock signal. (A valid frame code signal should be available for four successive cycles of the 4 MHz clock because of the oversampling of the 1 microsecond frame code bits by the 4 MHz clock as explained above.) This improves the accuracy of the frame code detection process. The AND gate 408 is enabled when the FRAME WINDOW signal, which defines a time window within which a valid frame code may occur, becomes active (as illustrated in FIG. 1). While the FRAME WINDOW signal is active, any pulse on the GS FRAME signal will be passed through the AND gate 408. Otherwise, the AND gate 408 remains disabled, produces a logic '0' signal at its output terminal.

If a logic 1' pulse occurs on the GS FRAME signal while the FRAME WINDOW signal is active, a logic '1' is supplied to the D input terminal of the first flip flop 404. The first D flip flop 404 is clocked by the inverted 4 MHz clock signal, i.e. a clock signal which is delayed by one-half cycle compared to the 4 MHz clock signal. When the first D flip flop 404 is clocked, a logic '1' signal appears at its Q output terminal. This enables the first NAND gate 410.

If the GS FRAME signal remains a logic '1' signal for the next succeeding cycle of the 4 MHz clock signal, the GS FRAME signal conditions the first NAND gate 410 to produce a logic '0' signal. Because the Q output terminal of the second flip flop 406 is still a logic '0' signal, the output terminal of the inverter 414 produces a logic '1' signal. However, the logic '0' signal from the first NAND gate 410 conditions the second NAND gate 412 to produce a logic '1' signal at its output terminal. This logic '1' signal is clocked through the second flip flop 406 at the next cycle of the inverted 4 MHz clock signal. The Q output terminal of the second flip flop 406, and thus the GS MODE signal, is made a logic '1' signal, as illustrated in FIG. 1. The logic '1' signal at the output of the second flip flop 406 conditions the inverter 414 to generate a logic '0' signal at its output terminal. This disables the second NAND (ate 412, which in turn produces a logic '1' signal. This causes the second flip flop 406 to continue to produce a logic '1' GS MODE signal when clocked by the inverted 4 MHz clock signal. Thus, when a GS FRAME signal is detected for two consecutive 4 MHz clock signal cycles, the GS MODE signal is made active, and remains active until reset at the beginning of the next horizontal line, as described above.

If, however, the GS FRAME signal does not remain a logic '1' signal at the next succeeding cycle of the 4 MHz clock signal, the AND gate 408 produces a logic '0' signal, which returns the first flip flop 404 to its quiescent condition, i.e. the Q output terminal generates a logic '0' signal. Thus, the first NAND gate 410 is disabled and produces a logic '1' signal. This conditions the second NAND gate 412 to produce a logic '0' signal, which in turn, maintains the second flip flop 406 in its quiescent condition, i.e. the Q output terminal generates a logic '0' signal. Thus, the GS MODE signal remains a logic '0' if the GS FRAME signal is active for only one 4 MHz clock cycle.

As described above, the CC FRAME detector 420 is constructed identically to the GS FRAME detector 416 and operates in the same manner to generate a logic '1' CC MODE signal when the CC FRAME signal is present for two consecutive 4 MHz clock cycles when the FRAME WINDOW signal is active. The CC MODE signal then remains a logic '1' signal until the beginning of the next horizontal line.

Figure 6:
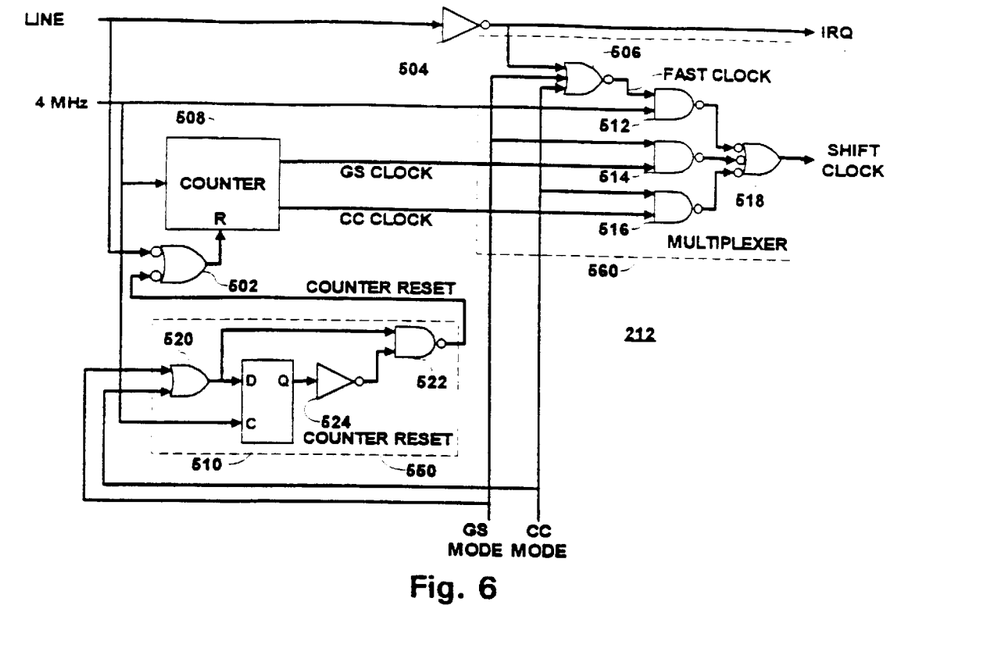

FIG. 6 shows, partially in block form, and partially in logic form,a portion of the controller circuit 212 of FIG. 3 which controls the SHIFT CLOCK signal supplied to the shift register 204. In FIG. 6, the LINE signal, generated internally in response to the composite synchronization signal, as described above, is coupled to a first input terminal of a first inverted input OR gate 502 and an input terminal of an inverter 504. An output terminal of the inverter 504 is coupled to a first input terminal of a NOR gate 506 and to the interrupt request signal output terminal IRQ, which is coupled to the microprocessor 50 (of FIG. 2).

The 4 Mhz clock signal from the crystal oscillator 40 (of FIG. 2) is coupled to an input terminal of a counter 508, to a clock input terminal of a D flip flop 510, and to a first input terminal of a first NAND gate 512. A first output terminal of the counter 508 generates a Gemstar clocking signal (GS CLOCK) that is coupled to a first input terminal of a second NAND gate 514. A second output terminal of the counter 508 generates a closed caption clocking signal (CC CLOCK) that is coupled to a first input terminal of a third NAND gate 516. An output terminal of the first NAND Pate 512 is coupled to a first input terminal of a second inverted input OR gate 518; an output terminal of the second NAND gate 514 is coupled to a second input terminal of the second OR gate 518; and an output terminal of the third NAND gate 516 is coupled to a third input terminal of the second OR gate 518. An output terminal of the second OR gate produces the SHIFT CLOCK signal, which is coupled to the clock input terminal of the shift register 204 (of FIG. 3). In combination, the NOR gate 506; first, second, and third NAND gates 512, 514 and 516; and the second OR gate 518 form a multiplexer 560.

The GS MODE signal from the mode signal control circuitry illustrated in FIG. 5 is coupled to a second input terminal of the NOR gate 506, to a first input terminal of a third OR gate 520, and to a second input terminal of the second NAND gate 514. The CC MODE signal from the mode signal control circuitry is coupled to a third input terminal of the NOR gate 506, to a second input terminal of the third OR gate 520, and to a second input terminal of the third NAND gate 516. An output terminal of the NOR gate 506, generating a FAST CLOCK signal, as illustrated in FIG. 1, is coupled to a second input terminal of the first NAND gate 512.

An output terminal of the third OR gate 520 is coupled to a D input terminal of the D flip flop 510, and to a first input terminal of a fourth NAND gate 522. A Q output terminal of the D flip flop 510 is coupled to an input terminal of a second inverter 524. An output terminal of the second inverter 524 is coupled to a second input terminal of the fourth NAND gate 522. In combination, the third OR gate 520, the D flip flop 510, the second inverter 524 and the fourth NAND gate 522 form a counter reset circuit 550. An output terminal of the fourth NAND gate 522 is coupled to a second input terminal of the first OR gate 502. An output terminal of the first OR sate 502 is coupled to a reset input terminal R of the counter 508.

In operation, the shift register 204 (of FIG. 3) is clocked at one of three rates during the active portion of the VBI horizontal line specified by the data in the register REG in the controller circuit 212: at a fast clock rate of 4 MHz before a valid frame code is detected, at a Gemstar data rate of 1 MHz after a Gemstar frame code is detected, and at a closed caption data rate of 500 kHz after a closed caption frame code is detected. The counter 508 receives the 4 MHz clock signal and, in a known manner, for example, using flip flop divider stages, frequency divides the 4 MHz clock signal to generate a 1 MHz Gemstar clocking signal GS CLOCK, and a 500 kHz closed caption clocking signal CC CLOCK. The 4 MHz clock signal, the GS CLOCK signal and the CC CLOCK signal are supplied to data input terminals of the multiplexer 560. The multiplexer 560 is controlled by the inverted LINE signal, the GS MODE signal and the CC MODE signal to generate a SHIFT CLOCK signal at the appropriate frequency.

As described above, and illustrated in FIG. 1, the LINE, GS MODE and CC MODE signals are logic '0' signals at the beginning of each horizontal line. In response to a logic '0' LINE signal, the first OR gate 502 provides a logic '1' signal to the reset input terminal R of the counter 508, which remains in the reset state. The LINE signal is made a logic '1' signal during the active portion of the VBI horizontal line specified by the data in the register REG in the controller circuit 212. In response to a logic '1' LINE signal the first OR gate 502 provides a logic '0' signal to the reset input terminal R of the counter 508, which begins to operate normally.

The LINE signal is inverted by the first inverter 504. The inverted LINE signal, thus, is a logic '0' signal during the active portion of the VBI horizontal line specified by the data in the register REG, and a logic '1' otherwise. Thus at the beginning of the active portion of the specified line, all of the inverted LINE, GS MODE and CC MODE signals are logic '0'. In response to all of the inverted LINE, GS MODE and CC MODE signals being logic '0' signals, the NOR gate 506 generates a logic '1' signal, which enables the first NAND gate 512. When enabled, the first NAND gate 512 passes the 4 MHz clock signal to its output terminal Simultaneously, in response to the GS MODE signal being a logic '0', the second NAND rate 514 is disabled which blocks the GS CLOCK signal from the second OR gate 518, and in response to the CC MODE signal being a logic '0' signal, the third NAND gate 516 is disabled which blocks the CC CLOCK signal from the second OR gate 518 The second OR gate 518 passes the 4 MHz signal to its output terminal, which, in turn, is coupled to the clock input terminal of the shift register 204. Thus, at the beginning of the active portion of the specified horizontal line, the shift clock is a 4 MHz signal.

If neither a Gemstar or closed caption frame code is detected in the specified horizontal line, the shift clock signal control circuitry of FIG. 6 remains in this state until the end of the active portion of the line. At the end of the active portion of the line, the LINE signal becomes a logic '0' signal and the inverted LINE signal becomes a logic '1' signal. The logic '0' LINE signal places the counter 508 into the reset state, as described above. The logic '1' inverted LINE signal conditions the NOR gate 506 to produce a logic '0' signal at its output terminal, which disables the first NAND gate 512, blocking the 4 MHz signal from the second OR gate 518 and the clock input terminal of the shift register 204.

When a Gemstar frame code is detected, the GS MODE signal becomes a logic '1' signal, as described above and illustrated in FIGS. 4 and 5. In response to a logic '1' GS MODE signal, the NOR gate 506 generates a logic '0' signal at its output terminal, disabling the first NAND gate 512, and blocking the 4 MHz signal from the second OR gate 518. Simultaneously, the logic '1' GS MODE signal enables the second NAND gate 514, which passes the GS CLOCK signal from the counter 508 to the second OR gate 518, and to the clock input terminal of the shift register 204. The resulting waveform is illustrated in FIG. 1 as the GS SAMPLE CLOCK waveform.

If a closed caption frame code is detected, the CC MODE signal becomes a logic '1' signal. In response to a logic '1' CC MODE signal, the NOR gate 506 generates a logic '0' signal at its output terminal, disabling the first NAND gate 512, and blocking the 4 MHz signal from the second OR gate 518. Simultaneously, the logic '1' CC MODE signal enables the third NAND gate 516, which passes the CC CLOCK signal from the counter 508 to the second OR gate 518, and to the clock input terminal of the shift register 204. The resulting, waveform is illustrated in FIG. 1 as the CC SAMPLE CLOCK waveform.

In order to adjust the phase of the shift register 204 clock to the center of the data bit periods, the counter 508 is reset when either the GS MODE or CC MODE signals become a logic '1' signal. At the beginning of each horizontal line the GS MODE or CC MODE signals are both logic '0' signals. This causes the third OR gate 520 to produce a logic '0' signal. This logic '0' signal is applied to the fourth NAND gate 522, disabling the NAND gate 522, which generates a logic '1' COUNTER RESET signal. At the same time, the logic '0' signal at the output terminal of the third OR gate 520 is clocked through the D flip flop 510 at each 4 MHz clock cycle to the Q output terminal. The logic '0' signal at the Q output terminal of the flip flop 510 is inverted by the second inverter 524 which provides a logic '1' input signal to the (disabled) fourth NAND gate 522.

The logic '1' COUNTER RESET signal from the fourth NAND gate 522 is supplied to the first OR gate 502. In response to this logic '1' signal, the first OR gate 502 provides a logic '0' signal to the reset input terminal R to the counter 508. In response to a logic '0' reset signal, the counter 508 operates normally.

When either of the GS MODE or CC MODE signals become a logic '1', the third OR gate 520 produces a logic '1' signal at its output terminal. This signal enables the fourth NAND gate 522. The enabled fourth NAND gate 522 produces a logic '0' signal at its output terminal as the COUNTER RESET signal in response to the logic '1' signal from the second inverter 524. The logic '0' COUNTER RESET signal conditions the first OR gate 502 to provide a logic '1' signal to the reset input terminal R of the counter 508, which enters the reset state.

At the next 4 MHz clock cycle, the logic '1' signal from the third OR gate 520 is latched through the D flip flop 510, and appears at its Q output terminal. This logic '1' signal is inverted by the second inverter 524, which supplies a logic '0' signal to the fourth NAND gate 522, disabling the fourth NAND gate again. The fourth NAND gate 522, thus, produces a logic '1' signal again, conditioning the first OR gate 502 to produce a logic '0' signal and allowing the counter 508 to operate normally again, but from a known, zeroed, state. Consequently, the counter will produce GS CLOCK and CC CLOCK signals with sampling times (i.e. leading edges) properly aligned with the middle of the respective Gemstar and closed caption data bit intervals.

Although the illustrated embodiment is described for Gemstar and closed caption data, one skilled in the art will understand that the present invention can be used in any data transmission system in which a frame code can be used to identify the format of the following auxiliary digital data.

What is claimed is:

1. In a television receiver, an auxiliary digital data extractor comprising:
   a source of a composite video signal including an auxiliary digital data component comprising one of: a) a first frame code having a predetermined number of bits and auxiliary data in a first format, and b) a second frame code having the predetermined number of bits and auxiliary data in a second format; comprising:
   a frame code detector, coupled to the composite video signal source, and responsive to a first proper subset of the predetermined number of frame code bits for detecting the first frame code, and responsive to a second proper subset of the predetermined number of frame code bits for detecting the second frame code;
   an auxiliary data utilization circuit, coupled to the composite video signal source and the frame code detector, for selectively receiving auxiliary data in the first format in response to detection of the first frame code and in the second format in response to detection of the second frame code.

2. The receiver of claim 1 further comprising:
   a slicer, coupled to the composite video signal source, for generating a digital bit stream representing the composite video signal;
   a register, coupled to the slicer, responsive to a clocking signal, and having an output terminal generating the predetermined number of bits, for storing samples of the digital bit stream from the slicer; and
   a register controller, coupled to the frame code detector, and having an output terminal producing the clocking signal for the register, for conditioning the register to sample the digital bit stream at a first rate when storing digital bit stream samples representing a frame code, at a second rate when storing samples representing auxiliary data in the first format, and at a third rate when storing samples representing auxiliary data in the second format; wherein:
   the frame code detector is coupled to the register, and responsive to a first subset of register output terminal bits, corresponding to the first subset of frame code bits, for detecting the first frame code, and responsive to a second subset of register output terminal bits, corresponding to the second subset of frame code bits, for detecting the second frame code.

3. The receiver of claim 2 wherein:
   the register controller comprises circuitry for venerating a register clocking signal for the register at the first rate such that the register is conditioned to oversample the composite video signal representative signal from the slicer when storing digital bit stream samples representing the frame code; and
   the frame code detector further comprises circuitry to detect one of the first and second frame code only when the one of the first and second frame code is detected for two consecutive digital bit stream samples.

4. The receiver of claim 2 wherein the frame code detector comprises:
   a first combinatorial logic circuit, coupled to the first subset of register output terminal bits, for generating a signal when signals at the first subset of register output terminals correspond to the first frame code; and
   a second combinatorial logic circuit, coupled to the second subset of register output terminal bits, for generating a signal when signals at the second subset of register output terminals correspond to the second frame code.

5. The receiver of claim 2 wherein the auxiliary data utilization circuit is coupled to the register for receiving sampled auxiliary data.

6. The receiver of claim 1 further comprising:
   a slicer, coupled to the composite video signal source, for generating a digital bit stream representing the composite video signal;
   a register, coupled to the slicer, responsive to a clocking signal, and having an output terminal generating fewer than the predetermined number of frame code bits, for storing samples of the digital bit stream from the slicer; and
   a register controller, coupled to the frame code detector, and hashing an output terminal producing the clocking signal for the register, for conditioning the register to sample the digital bit stream at a first rate when storing digital bit stream samples representing a frame code, at a second rate when storing samples representing auxiliary data in the first format, and at a third rate when storing samples representing auxiliary, data in the second format: wherein:
   the frame code detector is coupled to the register, and responsive to a first subset of register output terminal bits, corresponding to the first subset of frame code bits, for detecting the first frame code, and responsive to a second subset of register output terminal bits, corresponding to the second subset of frame code bits, for detecting the second frame code.

7. The receiver of claim 6 wherein:
   the register controller comprises circuitry for generating a register clocking signal for the register at the first rate such that the register is conditioned to oversample the composite video signal representative signal from the slicer when storing digital bit stream samples representing the frame code; and
   the frame code detector further comprises circuitry to detect one of the first and second frame code only when the one of the first and second frame code is detected for two consecutive digital bit stream samples.

8. The receiver of claim 6 wherein the frame code detector comprises:
- a first combinatorial logic circuit, coupled to the first subset of register output terminal bits, for generating a signal when signals at the first subset of register output terminals correspond to the first frame code; and
- a second combinatorial logic circuit, coupled to the second subset of register output terminal bits, for generating a signal when signals at the second subset of register output terminals correspond to the second frame code.

9. The receiver of claim 6 wherein the auxiliary data utilization circuit is coupled to the register for receiving sampled auxiliary data.

10. The receiver of claim 1 wherein the frame code detector operates in a further search mode responsive to all of the predetermined number of frame code bits for detecting one of the first frame code and second frame code.

11. The receiver of claim 1 wherein the auxiliary digital data component is in the active portion of a horizontal line in the vertical blanking interval composite video signal.

* * * * *